United States Patent [19]

Tiedemann, Jr. et al.

[11] Patent Number: 5,859,840

[45] Date of Patent: Jan. 12, 1999

[54] SPREAD SPECTRUM COMMUNICATION SYSTEM WHICH DEFINES CHANNEL GROUPS COMPRISING SELECTED CHANNELS THAT ARE ADDITIONAL TO A PRIMARY CHANNEL AND TRANSMITS GROUP MESSAGES DURING CALL SET UP

[75] Inventors: Edward G. Tiedemann, Jr.; Yu-Cheun Jou, both of San Diego; Joseph P. Odenwalder, Del Mar, all of Calif.

[73] Assignee: QUALCOMM Incorporated, San Diego, Calif.

[21] Appl. No.: 656,649

[22] Filed: May 31, 1996

[51] Int. Cl.$^6$ ............................. H04B 7/216; H04J 3/24
[52] U.S. Cl. ...................... 370/335; 370/441; 370/473; 370/522
[58] Field of Search .................... 370/335, 441, 370/468, 473, 433, 329, 336, 337, 203, 208, 209, 522

[56] References Cited

U.S. PATENT DOCUMENTS

| | | | |
|---|---|---|---|
| 3,310,631 | 3/1967 | Brown | 179/15 |
| 3,715,508 | 2/1973 | Blasbalg | 179/15 BC |
| 4,052,565 | 10/1977 | Baxter et al. | 179/1.5 S |
| 4,135,059 | 1/1979 | Schmidt | 179/15 |
| 4,220,821 | 9/1980 | Lucas | 370/110 |
| 4,256,925 | 3/1981 | Goode | 370/104 |
| 4,291,406 | 9/1981 | Bahl et al. | 371/44 |
| 4,291,409 | 9/1981 | Weinberg et al. | 375/1 |
| 4,298,979 | 11/1981 | Dobyns et al. | 370/104 |
| 4,301,530 | 11/1981 | Gutleber | 370/18 |
| 4,319,353 | 3/1982 | Alvarez, III et al. | 370/104 |
| 4,322,845 | 3/1982 | Fennel, Jr. et al. | 370/104 |
| 4,339,818 | 7/1982 | Gruenberg | 370/112 |
| 4,369,434 | 1/1983 | Mueller | 340/347 |
| 4,373,151 | 2/1983 | Houdard et al. | 329/104 |
| 4,383,315 | 5/1983 | Torng | 370/89 |
| 4,424,417 | 1/1984 | Chavey et al. | 179/2 E |
| 4,445,213 | 4/1984 | Baugh et al. | 370/94 |
| 4,455,649 | 6/1984 | Esteban et al. | 370/80 |
| 4,460,992 | 7/1984 | Gutleber | 370/19 |
| 4,472,815 | 9/1984 | Gutleber | 375/34 |
| 4,477,900 | 10/1984 | Gruenberg | 370/112 |
| 4,491,947 | 1/1985 | Frank | 370/94 |
| 4,494,232 | 1/1985 | Dambrackas et al. | 370/80 |
| 4,547,880 | 10/1985 | De Vita et al. | 370/91 |
| 4,562,572 | 12/1985 | Goldman et al. | 370/80 |
| 4,587,652 | 5/1986 | Goldman | 370/110.1 |
| 4,594,476 | 6/1986 | Freeman | 179/6.08 |
| 4,635,221 | 1/1987 | Kerr | 364/821 |
| 4,688,035 | 8/1987 | Gray et al. | 340/825.52 |
| 4,726,014 | 2/1988 | Goldman et al. | 370/58 |
| 4,730,340 | 3/1988 | Frazier, Jr. | 375/1 |

(List continued on next page.)

FOREIGN PATENT DOCUMENTS

| | | | |
|---|---|---|---|
| 0412583 | 2/1991 | European Pat. Off. | H04B 1/56 |
| 0418865 | 3/1991 | European Pat. Off. | H04L 12/56 |
| 0444592 | 9/1991 | European Pat. Off. | H04B 1/212 |
| 2022365 | 12/1979 | United Kingdom | H04Q 7/04 |
| 2182528 | 5/1987 | United Kingdom | H04J 3/00 |
| 9107030 | 5/1991 | WIPO | H04J 3/06 |

OTHER PUBLICATIONS

Kreyszig, Erwin, "Advance Engineering Mathematics", John Wiley & Sons, Section 4.7, 1979, pp. 186–190.

*Primary Examiner*—Douglas W. Olms
*Assistant Examiner*—David R. Vincent
*Attorney, Agent, or Firm*—Russell B. Miller; Bruce W. Greenhaus

[57] ABSTRACT

The present invention is a method and apparatus for transmitting a high rate data packet in a CDMA communication system. The transmission system transmits a first channel assignment message indicating the at least one additional channel that will be used to support the high rate data packet. The first channel assignment message is sent in advance of the onset of high rate data communications. In addition the present invention provides within the first frame of high rate data a duplicate channel assignment message. A remote receiver uses the channel assignment messages to initialize its demodulation elements to receive the additional information carried on the at least one additional channel.

4 Claims, 3 Drawing Sheets

FOREIGN PATENT DOCUMENTS

| | | | |
|---|---|---|---|
| 4,774,987 | 10/1988 | Sepling | 144/208 B |
| 4,805,167 | 2/1989 | Leslie | 370/540 |
| 4,839,892 | 6/1989 | Sasaki | 370/95 |
| 4,870,642 | 9/1989 | Nohara et al. | 370/75 |
| 4,872,200 | 10/1989 | Jansen | 380/34 |
| 4,876,698 | 10/1989 | Boisson et al. | 375/25 |
| 4,899,337 | 2/1990 | Hirai | 370/80 |
| 4,901,307 | 2/1990 | Gilhousen et al. | 370/18 |
| 4,930,118 | 5/1990 | Sugihara | 370/16 |
| 4,933,952 | 6/1990 | Albrieux et al. | 375/1 |
| 4,939,745 | 7/1990 | Kirimoto et al. | 375/1 |
| 4,965,796 | 10/1990 | Petty | 370/112 |
| 4,970,648 | 11/1990 | Capots | 364/424.06 |
| 5,003,533 | 3/1991 | Watanabe | 370/85.5 |
| 5,003,534 | 3/1991 | Gerhardt et al. | 370/94 |
| 5,068,849 | 11/1991 | Tanaka | 370/85.5 |
| 5,101,501 | 3/1992 | Gilhousen et al. | 455/33 |
| 5,103,459 | 4/1992 | Gilhousen et al. | 375/1 |
| 5,107,377 | 4/1992 | Ballard | 360/40 |
| 5,115,429 | 5/1992 | Hluchyj et al. | 370/84 |
| 5,121,383 | 6/1992 | Golestani | 370/60 |
| 5,168,575 | 12/1992 | Cizek et al. | 455/33.1 |
| 5,172,375 | 12/1992 | Kou | 370/95.3 |
| 5,179,549 | 1/1993 | Joos et al. | 370/17 |
| 5,212,684 | 5/1993 | MacNamee et al. | 370/24 |
| 5,212,687 | 5/1993 | De La Bourdonnaye | 370/84 |
| 5,216,503 | 6/1993 | Paik et al. | 358/133 |
| 5,231,649 | 7/1993 | Duncanson | 375/38 |
| 5,276,730 | 1/1994 | Cimini, Jr. et al. | 379/60 |
| 5,280,537 | 1/1994 | Sugiyama et al. | 375/1 |
| 5,293,640 | 3/1994 | Gunmar et al. | 455/33.1 |
| 5,305,308 | 4/1994 | English et al. | 370/32.1 |
| 5,349,580 | 9/1994 | Hester et al. | 370/84 |
| 5,351,240 | 9/1994 | Highsmith | 370/84 |
| 5,381,412 | 1/1995 | Otani | 370/84 |
| 5,400,328 | 3/1995 | Burren et al. | 370/79 |
| 5,420,861 | 5/1995 | De La Bourdonnaye | 370/84 |
| 5,440,542 | 8/1995 | Procter et al. | 370/18 |
| 5,442,625 | 8/1995 | Gitlin et al. | 370/18 |

SPREAD SPECTRUM COMMUNICATION SYSTEM WHICH DEFINES CHANNEL GROUPS COMPRISING SELECTED CHANNELS THAT ARE ADDITIONAL TO A PRIMARY CHANNEL AND TRANSMITS GROUP MESSAGES DURING CALL SET UP

BACKGROUND OF THE INVENTION

I. Field of the Invention

The present invention relates to communications. More particularly, the present invention relates to a novel and improved communication system wherein a user transmits data on a primary channel. However, when the user's transmission exceeds the capacity of the primary channel, the user is provided use of an additional channel or set of channels for use in conjunction with the primary channel to enable the transmission of high rate data. The present invention provides for dynamic channel assignment for the transmission of high rate data and provides a highly efficient system for the transmission of variable rate data.

II. Description of the Related Art

The present invention is concerned with multiple users sharing a communications resource such as in a cellular CDMA system. The use of code division multiple access (CDMA) modulation techniques is one of several techniques for facilitating communications in which a large number of system users are present. Other multiple access communication techniques, such as time division multiple access (TDMA), frequency division multiple access (FDMA) and AM modulation schemes such as amplitude companded single sideband (ACSSB) are known in the art. However, the spread spectrum modulation technique of CDMA has significant advantages over these other modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Path diversity is obtained by exploiting the multipath environment through spread spectrum processing by allowing a signal arriving with different propagation delays to be received and processed separately. Furthermore, space or path diversity is obtained by providing multiple signal paths through simultaneous links between a mobile user and two or more base stations. Examples of the utilization of path diversity are illustrated in U.S. Pat. No. 5,109,390 entitled "DIVERSITY RECEIVER IN A CDMA CELLULAR TELEPHONE SYSTEM", and U.S. Pat. No. 5,101,501 entitled "SOFT HANDOFF IN A CDMA CELLULAR TELEPHONE SYSTEM", both assigned to the assignee of the present invention and incorporated by reference herein.

An additional technique that may be used to increase the efficiency of the allocation of the communication resource is to allow the users of the resource to provide data at varying rates thereby using only the minimum amount of the communication resource to meet their service needs. An example of variable rate data source is a variable rate vocoder which is detailed in U.S. Pat. No. 5,414,796, entitled "VARIABLE RATE VOCODER," assigned to the assignee of the present invention and incorporated herein by reference. Since speech inherently contains periods of silence, i.e. pauses, the amount of data required to represent these periods can be reduced. Variable rate vocoding most effectively exploits this fact by reducing the data rate for these silent periods.

A variable rate speech encoder provides speech data at full rate when the talker is actively speaking, thus using the full capacity of the transmission frames. When a variable rate speech coder is providing speech data at a less than maximum rate, there is excess capacity in the transmission frames. A method for transmitting additional data in transmission frames of a fixed size, wherein the data source is providing data at a variable rate is described in detail in U.S. Pat. No. 5,504,773, entitled "METHOD AND APPARATUS FOR THE FORMATTING OF DATA FOR TRANSMISSION", assigned to the assignee of the present invention and incorporated by reference herein. In the above mentioned patent application a method and apparatus is disclosed for combining data of differing types from different sources in a data packet for transmission.

SUMMARY OF THE INVENTION

A communications resource is typically divided into communications channels. The present invention is described in the context of a CDMA communication system, wherein each channel is provided by spreading the data by a different spreading sequence. In the exemplary embodiment, the spreading sequences used are orthogonal Walsh sequences.

In the present invention, each user is provided with a dedicated channel, referred to herein as the primary channel. In addition, each user is provided with selective access to a pool of common channels, referred to herein as additional channels which can be shared by all users of the communication system.

When the rate of a user's transmission exceeds the capacity of the primary channel, the communication system determines whether sufficient additional channels are available for the transmission of the high rate data. If sufficient additional channels are available, they are assigned to the user for transmission of the high rate data.

In the present invention, after determining that sufficient additional channels are available but prior to the onset of the high rate transmission, the transmitter sends a message, referred to herein as the first channel assignment message, to the receiver indicating a forthcoming high rate data transmission. In the exemplary embodiment, the channel assignment message identifies the additional channels that will be used to support the high rate data service. In the exemplary embodiment, the first channel assignment message is transmitted two frames in advance of the high rate transmission. By using the first channel assignment message the receiving system need not demodulate all possible channels at all times which greatly reduces power consumption of the mobile station.

In an improved embodiment, a secondary channel assignment message containing the same information as the first channel assignment message is provided on the primary channel at the onset of the high rate data communication. This provides a second indication of the high rate data transmission which can be relied upon if the frame carrying the first channel assignment message is not properly received.

In the present invention, the receiving system initializes a set of additional demodulators to demodulate the high rate data in accordance with the information provided in the first channel assignment message. The high rate data is demodulated by the primary channel demodulator and the additional channel demodulators and the demodulated frames are combined and provided to the user.

If a frame erasure occurs, the receiving system demodulates all possible additional channels as though a first channel assignment message had been received in the erased frame. The receiving system then uses the secondary channel assignment message to re-assemble the frame and to initialize the additional demodulators for receiving the next frames.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A multiple access communication resource is divided into channels. This division is usually called multiplexing, three specific types being: frequency division multiplexing (FDM), time division multiplexing (TDM), and code division multiplexing (CDM). The basic unit of information transmitted and received in a communication system is referred to as a frame.

Figure 1:
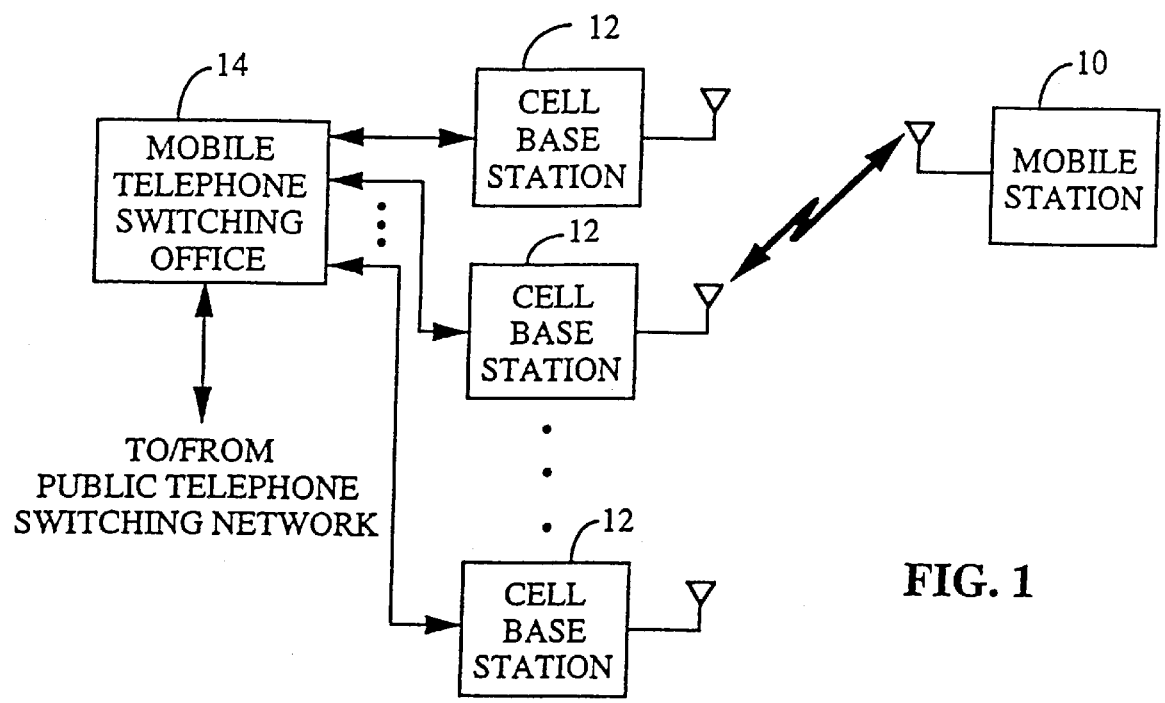
FIG. 1 is a diagram illustrating an exemplary implementation of the present invention in a mobile communication system.

Referring now to the figures, FIG. 1 illustrates an exemplary implementation of the present invention in a mobile communication system. Mobile station 10 transmits information to and receives information from cell base station 12. Cell base station 12, in turn, transmits information to and receives information from mobile telephone switching office (MTSO) 14. MTSO 14, in turn, transmits information to and receives information from a public switching telephone network (not shown).

In the exemplary embodiment, the signals transmitted by cell base station 12 to mobile station 10 are spread spectrum signals as are the signals transmitted from mobile station 10 to cell base station 12. The generation of spread spectrum communication signals is described in detail in the aforementioned U.S. Pat. Nos. 4,901,307 and 5,103,459. The exemplary embodiment of the present invention is described in terms of a method for providing high rate data packets from cell base station 12 to mobile station 10 referred to herein as forward link transmissions. However, the present invention is equally applicable to the reverse link transmission of data from mobile station 10 to cell base station 12.

In the exemplary embodiment, mobile station 10 is assigned a primary channel for communications with base station 12. In the exemplary embodiment, a single channel is provided by a unique Walsh spreading sequence as is described in detail in the aforementioned U.S. Pat. Nos. 4,901,307 and 5,103,459. In the present invention, cell base station 12 uses additional channels to provide high rate data transmission to mobile station 10.

As referred to herein, high rate data packets are those which require more capacity than the primary channel for their transmission. In the exemplary embodiment, the data is transmitted in packets. If a packet contains high rate data, its contents are divided into a plurality of frames, each of which can be transmitted on a single channel and recombined at the receiver.

Figure 2:
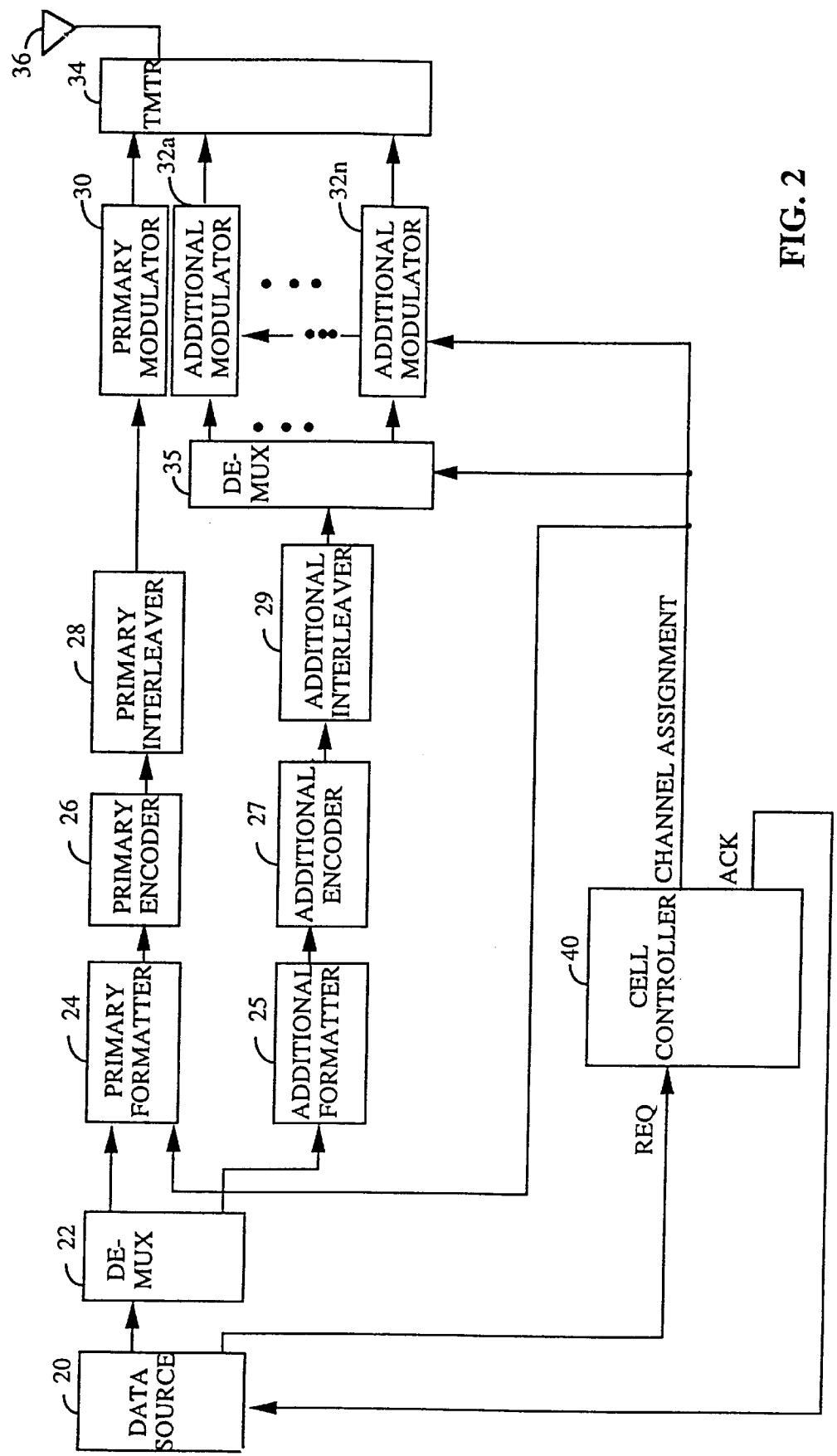
FIG. 2 is a block diagram of the transmission system of the present invention.

FIG. 2 illustrates a block diagram of the exemplary embodiment of the transmission system of the present invention. Data source 20 provides the packets of data for transmission from cell base station 12 to mobile station 10. Data source 20 is provided for illustrative purposes. It should be noted that bases station 12 is typically relaying information from remote location and data source 20 is simply a convenient way to illustrate a source of the packets of data for transmission. Data source 20 can provide both packets of data less than capacity limits of the primary channel and high rate data requiring the use of the primary channel plus one or more additional channels to carry the packet.

When the data packet for transmission can be transmitted using only the assigned primary channel, data source 20 provides the packet of data through de-multiplexer (DE-MUX) 22 to primary formatter 24. In the exemplary embodiment, primary formatter 24 generates a set of redundant bits for the packet in accordance with error correction and detection methods that are well known in the art. In the exemplary embodiment, formatter 24 generates a set of cyclic redundancy check (CRC) bits and a set of code tail bits and appends those sets of bits to the outgoing packet, the generation of which is detailed in the aforementioned U.S. Pat. No. 5,550,773.

Primary formatter 24 outputs the packet to primary encoder 26 which encodes the packet to provide encoded symbols. In the exemplary embodiment, primary encoder 26 is a rate ½ convolutional encoder, the design and implementation of which are well known in the art. In an exemplary embodiment, the convolutional encoder is implemented using a digital shift register. Primary encoder 26 provides the encoded data packet to primary interleaver 28.

Primary interleaver 28 reorders the binary digits of the encoded packet in accordance with a predetermined reordering format. In the exemplary embodiment, primary interleaver 28 is a block interleaver. In a block interleaver, the data is written into memory in columns and output in rows. In conjunction with error correcting code, interleaving increases the time diversity of the data, and therefore increases the robustness against bursty channel errors.

The interleaved packet is provided by primary interleaver 28 to primary modulator 30. Primary modulator 30 modulate the frames in order to provide the frame on the assigned primary channel. In the exemplary embodiment modulator 30 is a code division multiple access (CDMA) modulator as described in detail in U.S. Pat. Nos. 4,901,307 and 5,103,459. In the exemplary embodiment, each frame is spread by a Walsh sequence ($W_n$) that is unique to that channel and orthogonal to all other Walsh sequences used by all other channels upon which data is transmitted from base station 12. In the exemplary embodiment, data on the primary channel can be variable rate in accordance with the industry standard TIA/EIA/IS-95-A Mobile Station-Base Station Compatibility Standard for Dual-Mode Wideband Spread Spectrum Cellular System, whereas data provided on the additional channels is scheduled at a fixed rate.

In the exemplary embodiment, the spread frame is then covered using a pseudorandom noise (PN) sequence which provides greater separation in code space and identification for each base station 12. Each channel is distinguished uniquely by its Walsh sequence. There are a limited number of available orthogonal sequences, so the greater the number of users transmitting at high rates the fewer the number of users that can be accommodated by base station 12. Modulator 30 provides the modulated frame to transmitter (TMTR) 34, which frequency upconverts and amplifies the modulated frame, and transmits the signal through antenna 36.

When data source 20 prepares to transmit high rate data packet, it provides a request signal (REQ) to cell controller 40 of cell base station 12. Cell controller 40 responds by providing an acknowledgment of the request (ACK). Cell controller 40 selects additional channels which will be used for the transmission of the high rate data. In the exemplary embodiment, the pool of possible additional channels that can be used for the transmission of high rate data is pre-defined so that selection can be performed by a simple masking technique as is well known in the art. In another exemplary embodiment sets of additional channels are pre-defined and channel assignment messages simply identify one of the predefined sets. In an improved embodiment, the pre-defined sets consist of different number of additional channels. Cell controller 40, generates a channel assignment message, which indicates the additional Walsh channel or channels that will be used to carry the high rate data two frames (40 ms) later and provides that message to primary formatter 24.

The channel assignment message can be provided with its own CRC check bits to provide additional reliability or can be transmitted without its own check bits using only a minimum number of additional bits. If the present invention is to be used in a time division multiple access communication system, then the channel assignment messages would specify additional time slots where data will be provided to mobile station 10. Similarly if the present invention is applied to a frequency division multiple access communication system, then the channel assignment messages would specify additional frequencies which will be used to provide data to mobile station 10.

In the exemplary embodiment, the channel assignment message is provided as additional signaling data which is combined with the outgoing data on the primary channel. The channel assignment message transmitted in advance of the onset of the high rate data transmissions is referred to herein as the first channel assignment message. A method for combining outgoing traffic data with signaling data is described in detail in the aforementioned U.S. Pat. No. 5,550,773. In an alternative embodiment, the first channel assignment message is punctured into the outgoing data frame on the primary channel by methods well known in the art.

The frame containing the first channel assignment message is formatted as described above by primary formatter 24 and encoded by primary encoder 26 as described above. The encoded symbols are then provided to primary interleaver 28 which reorders the symbols as described above. In the exemplary embodiment, the channel assignment message, signaling messages (if they exist), control messages (if they exist) and part of the data are all transmitted on the primary channel by primary modulator 30, the additional channels only carry data. In the exemplary embodiment, power control bits if they exist are punctured into the primary channel data to provide closed loop power control of the type described in the aforementioned U.S. Pat. No. 5,109,501. The primary channel can be variable or fixed rate or it can be used as a dedicated control channel. The modulated frame is upconverted and amplified by transmitter 34 and transmitted through antenna 36.

In the exemplary embodiment, the first channel assignment message is provided two frames in advance of the onset of high rate data transmissions to provide sufficient time for the receiver (illustrated in FIG. 3) to prepare for its reception. In the exemplary embodiment, during the call set-up, the additional channels are grouped by cell controller 40 and transmitted to mobile station 10. In the exemplary embodiment, this group of additional channels can be updated during the call. Defining the set of possible additional channels in advance allows the channel assignment message to require only a few bits to identify the channels to be used. Instead of sending a signal identifying the additional channels to be used, the base station can send a mask signal that will allow high rate demodulation controller 117 to identify the additional channels.

Because there is a chance that the frame carrying the first channel assignment message may be received in error, the present invention provides the channel assignment information redundantly in a secondary channel assignment message transmitted on the primary channel.

At the onset of high rate data transmissions, data source 20 provides the high rate data packet to de-multiplexer 22. De-multiplexer 22 divides the high rate data packet into two parts. The first part is contained in a frame to be transmitted on the primary channel. The second part is contained in frames to be transmitted on additional channels. The frame to be transmitted on the primary channel is processed as described above.

The data bits for the additional channels are provided to additional formatter 25. Additional formatter 25 generates a set of CRC bits for the incoming data and a set of code tail bits. The formatted data from additional formatter 25 is provided to additional encoder 27 which encodes the data to provide encoded symbols. In the exemplary embodiment, additional encoder 27 is a convolutional encoder.

The encoded symbols are provided to additional interleaver 29, which as described above reorders the encoded symbols in accordance with a predetermined ordering format. In a first embodiment of primary interleaver 28 and additional interleaver 29, the interleavers use the same number of addresses but variable words size to accommodate different sized blocks of data for interleaving. In an alternative embodiment of primary interleaver 28 and additional interleaver 29, the interleavers use a variable number of addresses and a fixed word size to accommodate varying block size. The reordered encoded symbols are provided to de-multiplexer (DE-MUX) 35 which divides the additional frame into frames each of which is carried on an additional channel.

Each of the additional frames from de-multiplexer 35 is provided to a different one of additional modulators 32a–32n. In the exemplary embodiment, the modulated additional frames from additional modulators 32a–32n are combined with the modulated frame from primary modulator 30 by transmitter 34 before transmission. Transmitter 34 upconverts and amplifies the combined signal and transmits that signal through antenna 36.

Figure 3:
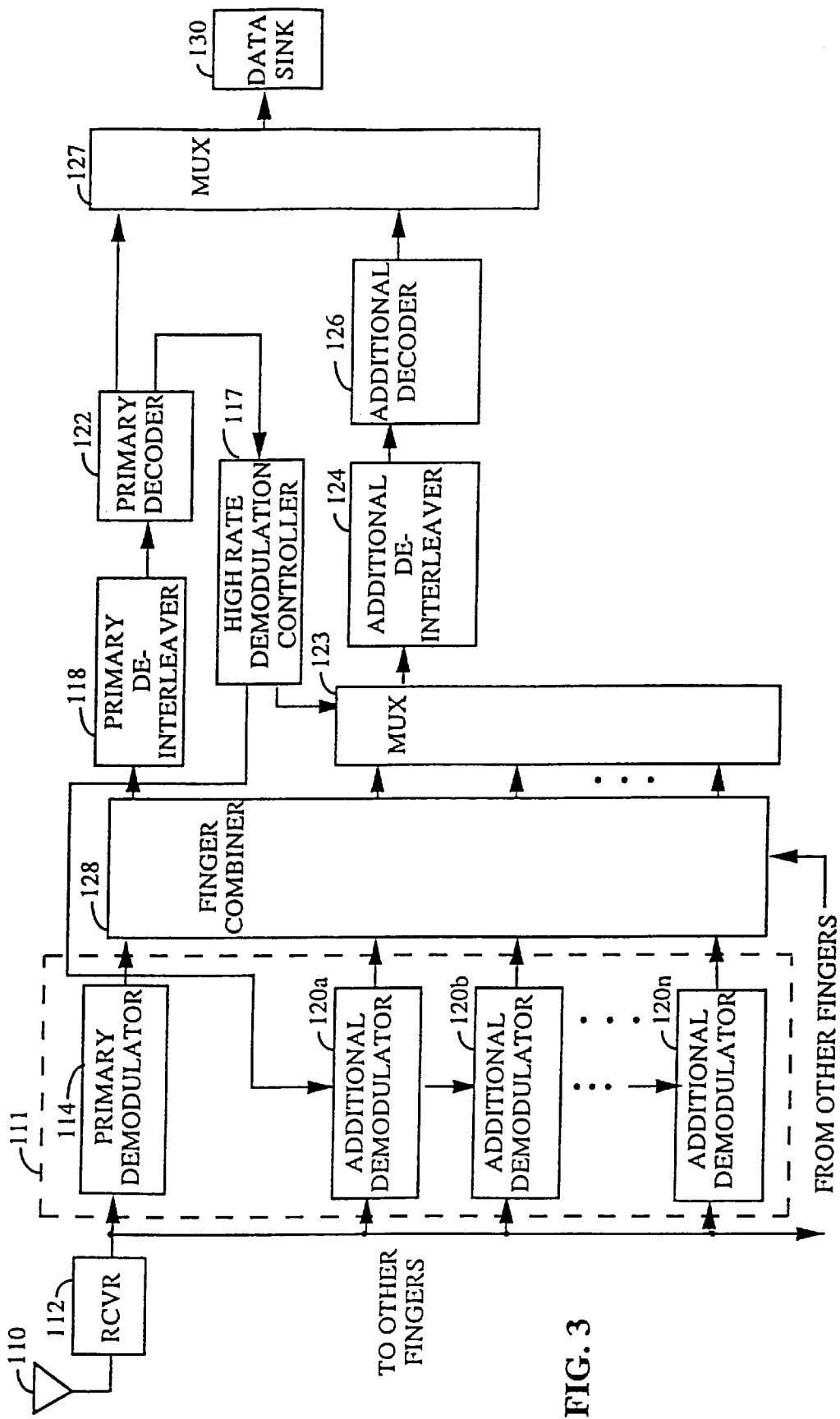
FIG. 3 is a block diagram of a receiver system of the present invention.

Now referring to FIG. 3, the signal broadcast through antenna 36 of FIG. 2 is received at the by antenna 110 and provided to receiver (RCVR) 112. Receiver 112 downconverts, filters and amplifies the received signal and provides the received signal to demodulation circuit 111.

Demodulation circuit 111 represents one "finger" of a RAKE receiver should such a design be used. In a RAKE receiver implementation, multipath signals received at mobile station 10 with different propagation path delays are demodulated separately and the results of those demodulation operations are then combined in finger combiner 128. The design and implementation of a RAKE receiver is described in detail in aforementioned U.S. Pat. No. 5,109,390.

In the exemplary embodiment, primary demodulator 114 and additional demodulators 120a–120n are CDMA demodulators as disclosed in the aforementioned U.S. Pat. Nos. 4,901,307 and 5,103,459. In the exemplary embodiment, primary demodulator 114 and additional demodulators 120a–120n are quadrature phase shift keying (QPSK) demodulators.

Primary demodulator 114 despreads the received signal in accordance with the allocated primary channel Walsh sequence and PN code. The despread primary frame is provided to finger combiner 128, which combines the primary frame soft decision from finger demodulator 111 with soft decisions from other fingers to provide an improved soft decision. The improved soft decisions are provided to primary de-interleaver 118, which reorders the demodulated soft decisions in accordance with a predetermined re-ordering format. The design and implementation of de-interleavers are well known in the art. In the exemplary embodiment, de-interleavers 118 and 124 either operate using a fixed number of addresses and variable word size or a fixed word size and variable number of addresses to accommodate different sized data packets.

De-interleaver 118 provides the reordered frame to primary decoder 122, which decodes the frame. In the exemplary embodiment, primary decoder 122 and additional decoder 126 are Viterbi decoders, the design and implementation of which are well known in the art. The decoded frame from primary decoder 122 is provided through multiplexer 127 to data sink 130 which could be the user of mobile station 10 or further processing elements.

If the frame containing a first channel assignment message is received without error, then the decoded channel assignment message is provided to high rate data controller 117. High data rate controller can be implemented using a microprocessor programmed to perform the necessary functions. High rate data controller 117 provides the necessary Walsh sequence identification and PN code information to additional demodulators 120a–120n to demodulate the additional data.

The RF signal is received by antenna 110 and provided to receiver 112. Receiver 112 amplifies and down converts the received signal and provides the received signal to primary demodulator 114 and additional demodulators 120a–120n.

The demodulated primary frame from the primary channel is provided to finger combiner 128 to provide improved demodulated soft decisions as described above. The improved soft decisions are provided to primary de-interleaver 118 which re-orders the soft decisions as described above. The reordered frame is provided to primary decoder 122 which decodes the de-interleaved frame and provides the decoded frame to multiplexer (MUX) 127.

The received signal is also provided to additional demodulators 120a–120n which demodulate the signals in accordance with the channel information provided in the first channel assignment message. The demodulated frames of data from additional demodulators 120a–120n are provided to finger combiner 128 to generate improved soft decisions for each of the additional frames. The improved soft decisions of the demodulated frames are provided to multiplexer (MUX) 123 which re-assembles the packet containing the additional data. In the exemplary embodiment, multiplexer 123 operates in accordance with a signal from high rate demodulation controller 117 which indicates the additional demodulators that are being used and how to re-assemble the packet containing additional data.

The re-assembled packet of additional data is provided to additional de-interleaver 124 which re-orders the soft decisions in accordance with a predetermined de-interleaving format. The reordered soft decisions are provided to additional decoder 126. Although illustrated as two separate blocks, primary decoder 122 and additional decoder 126 can be implemented using the same hardware, such as a microprocessor programmed to perform the specified function or an application specific integrated circuit (ASIC) designed to perform the specified function. Additional decoder 126 decodes the additional packet of data and provides the decoded bits to multiplexer 127.

Multiplexer (MUX) 127 combines the decoded data transmitted on the primary channel with the decoded data transmitted on the additional channels. The reassembled data packet is provided to data sink 130.

If a frame erasure occurs and the content of the first channel assignment message is unknown, the receiver system will operate on the basis of a worst case scenario. The receiver will demodulate the maximum set of additional channels possible and it will demodulate the last such set used. It will then decide which frames from additional channels are to be used as valid data once the secondary channel assignment message for the current data packet is properly decoded.

If both frames containing the first and secondary channel assignment messages are received in error, then the corresponding received data will be discarded and an erasure is declared.

The present invention is equally applicable to variable rate data transmission and fixed rate transmission. For fixed rate transmission, the channel assignment message data will typically remain constant throughout the service. However should the need for additional channels arise for signaling or other data traffic, the channel assignment messages will be allowed to vary to indicate the additional channel to be used for the transmission of that data.

For variable rate transmissions, the scheduling is done so that only the necessary number of additional channels for the current data packet size are assigned. The number of additional channels to be assigned depends on the amount of data to be sent. This could be done on a frame by frame basis.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for transmitting high rate packet data comprising:
 a cell controller comprising a processor capable of:
  defining channel groups such that each group comprises selected channels that are additional to a primary channel;

associating said groups with a predetermined indication;

generating a group message indicating which additional channels are associated with each indication; and generating a first channel assignment message including at least one of said indications indicative of which additional channels will be used to support the transmission of said high rate data packet; and a transmitter capable of transmitting said group message during call set-up, and after call setup, transmitting said first channel assignment message on said primary channel and transmitting said high rate data packet on both said primary channel and at least one additional channel associated with the indicated group.

2. The apparatus of claim 1 wherein said first channel assignment message is transmitted in advance of said high rate data packet.

3. The apparatus of claim 2 wherein said first channel assignment message is transmitted two frames in advance of said high rate data packet.

4. The apparatus of claim 1 wherein:

said first channel assignment message is transmitted in advance of said high rate data;

said cell controller is also capable of generating a second channel assignment message, said second channel assignment message being redundant with said first channel assignment message; and said transmitter is also capable of transmitting a secondary channel assignment message in a first frame of said high rate data packet.

* * * * *